United States Patent
Wang et al.

(10) Patent No.: US 9,240,859 B2
(45) Date of Patent: Jan. 19, 2016

(54) METHOD AND DEVICE FOR CORRECTING CHANNEL QUALITY INDICATOR VALUE

(71) Applicant: Huawei Technologies Co., LTD, Shenzhen (CN)

(72) Inventors: Chengyi Wang, Shanghai (CN); Fangfu Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 14/102,001

(22) Filed: Dec. 10, 2013

(65) Prior Publication Data

US 2014/0098697 A1 Apr. 10, 2014

Related U.S. Application Data

(63) Continuation of application No. PCT/CN2011/075583, filed on Jun. 10, 2011.

(51) Int. Cl.
*H04L 1/00* (2006.01)
*H04W 24/02* (2009.01)

(52) U.S. Cl.
CPC ............ *H04L 1/0026* (2013.01); *H04L 1/0028* (2013.01); *H04W 24/02* (2013.01)

(58) Field of Classification Search
None
See application file for complete search history.

(56) References Cited

U.S. PATENT DOCUMENTS

2002/0141377 A1* 10/2002 Baker et al. ................... 370/349
2005/0025112 A1* 2/2005 Koo et al. ..................... 370/342
2005/0053038 A1 3/2005 Kimura
2008/0130512 A1 6/2008 Park et al.
2009/0075598 A1 3/2009 Pietraski et al.
2009/0287970 A1* 11/2009 Iizuka et al. .................. 714/704
2010/0034092 A1* 2/2010 Krishnamurthy et al. .... 370/241
2010/0067396 A1* 3/2010 Cui et al. ....................... 370/252
2010/0112952 A1* 5/2010 Molnar et al. ................ 455/63.1
2010/0113028 A1* 5/2010 Simonsson et al. ........... 455/437
2010/0202284 A1* 8/2010 Tidestav ........................ 370/216
2012/0099471 A1* 4/2012 Brannstrom et al. ......... 370/252
2012/0207054 A1* 8/2012 Okubo et al. ................. 370/252
2014/0086182 A1 3/2014 Shin et al.

FOREIGN PATENT DOCUMENTS

| CN | 1728582 A | 2/2006 |
|---|---|---|
| CN | 101018387 A | 8/2007 |
| CN | 101729208 A | 6/2010 |
| CN | 101877624 A | 11/2010 |
| EP | 1592139 A2 | 11/2005 |

(Continued)

OTHER PUBLICATIONS

Extended European Search Report received in Application No. 11867129.6-1860 mailed Mar. 6, 2014, 6 pages.

(Continued)

*Primary Examiner* — Gary Mui
(74) *Attorney, Agent, or Firm* — Slater & Matsil, L.L.P.

(57) ABSTRACT

Embodiments of the present invention provide a method and a device for correcting a CQI value. Information indicates radio channel characteristics. A block error rate (BLER) target value is determined according to the information that indicates radio channel characteristics. A channel quality indicator (CQI) measurement value is corrected according to a BLER measurement value and the determined BLER target value.

20 Claims, 4 Drawing Sheets

(56) References Cited

FOREIGN PATENT DOCUMENTS

| | | |
|---|---|---|
| EP | 2139138 A1 | 12/2009 |
| EP | 2182665 A1 | 5/2010 |
| EP | 2434676 A1 | 3/2012 |
| EP | 2587707 A1 | 5/2013 |
| KR | 20070085747 A | 8/2007 |
| KR | 20080048435 A | 6/2008 |
| KR | 20090091121 A | 8/2009 |

OTHER PUBLICATIONS

Chinese Search Report received in Application No. 2011800013557 mailed Nov. 27, 2012, 2 pages.

Cui, T. et al., "Throughput Optimization in High Speed Downlink Packet Access (HSDPA)," IEEE Communications Society, published Dec. 13, 2010, 5 pages.

International Search Report and Written Opinion received in Application No. PCT/CN2011/075583 mailed Mar. 1, 2012, 10 pages.

\* cited by examiner

US 9,240,859 B2

METHOD AND DEVICE FOR CORRECTING CHANNEL QUALITY INDICATOR VALUE

This application is a continuation of International Application No. PCT/CN2011/075583 filed on Jun. 10, 2011, which is hereby incorporated by reference in its entirety.

TECHNICAL FIELD

The present invention relates generally to a communication systems and methods, and, in particular embodiments, to a method and device for correcting channel quality indicator value.

BACKGROUND

A high speed downlink packet access (HSDPA) technology is introduced to Release 5 (R5) of the 3rd Generation Partnership Project (3GPP), and by using a series of key technologies such as adaptive modulation and coding, hybrid automatic retransmission, higher-order modulation, base station 2 ms fast scheduling, and the like, downlink high-speed data transmission is achieved.

In an HSDPA system, a user terminal measures quality of a received radio channel, where each channel quality level corresponds to one channel quality indicator (CQI) value, and returns a CQI value to a base station. After receiving the CQI, the base station, with reference to usable power resources and code resources and a data volume in a transmission cache, transmits data blocks in a proper size by adopting an appropriate transmit power, the appropriate number of code channels and an appropriate modulation manner. This is the adaptive modulation and coding technology in the HSDPA system.

The inventor of the present invention finds that accuracy of CQI feedback has a severe impact on a data transmission rate in HSDPA. Accuracy of CQI measurement is related to an implementation algorithm of a user terminal, which is uncontrollable by a network side.

SUMMARY OF THE INVENTION

Embodiments of the present invention provide a method and a device for correcting a CQI value, so as to avoid the impact of an error in a CQI measurement value.

According to one aspect, a method for correcting a channel quality indicator value is provided, mainly including obtaining information that indicates radio channel characteristics, determining, according to the obtained information that indicates radio channel characteristics, a block error ratio (BLER) target value, and correcting, according to a BLER measurement value and the determined BLER target value, a channel quality indicator (CQI) measurement value.

According to another aspect, a device for correcting a CQI is provided, mainly including a radio channel characteristic obtaining unit, configured to obtain information that indicates radio channel characteristics, a target value determining unit, configured to determine, according to the information that indicates radio channel characteristics obtained by the radio channel characteristic obtaining unit, a BLER target value, and a correcting unit, configured to correct, according to the BLER target value determined by the target value determining unit and a BLER measurement value, a channel quality indicator CQI measurement value.

Further, the device for correcting a CQI value may be a user terminal or a network side device.

According to the method and the device provided by the embodiments of the present invention, a BLER target value is determined according to information that indicates radio channel characteristics, and then a CQI is corrected according to the BLER target value, so that different channel conditions are considered, and the CQI value returned is relatively accurate. Therefore, the impact of an error in a CQI measurement value can be avoided, and a transmission rate and air interface capacity can be improved.

DETAILED DESCRIPTION OF ILLUSTRATIVE EMBODIMENTS

To make the objectives, technical solutions, and advantages of the present invention clearer, the following further describes the technical solutions of the present invention in detail with reference to the accompanying drawings and specific embodiments.

The technical solutions of the embodiments can be applied to various communication systems such as Wideband Code Division Multiple Access (WCDMA), Time Division Synchronous Code Division Multiple Access (TD-SCDMA), Long Term Evolution (LTE), and the like. In WCDMA and TD-SCDMA systems, a base station is a NodeB, and a base station control device is a radio network controller (RNC); and in an LTE system, a base station is an evolved base station (eNodeB), and a base station control device includes a servicing gateway (SGW) and a mobile management entity (MME).

Figure 1:
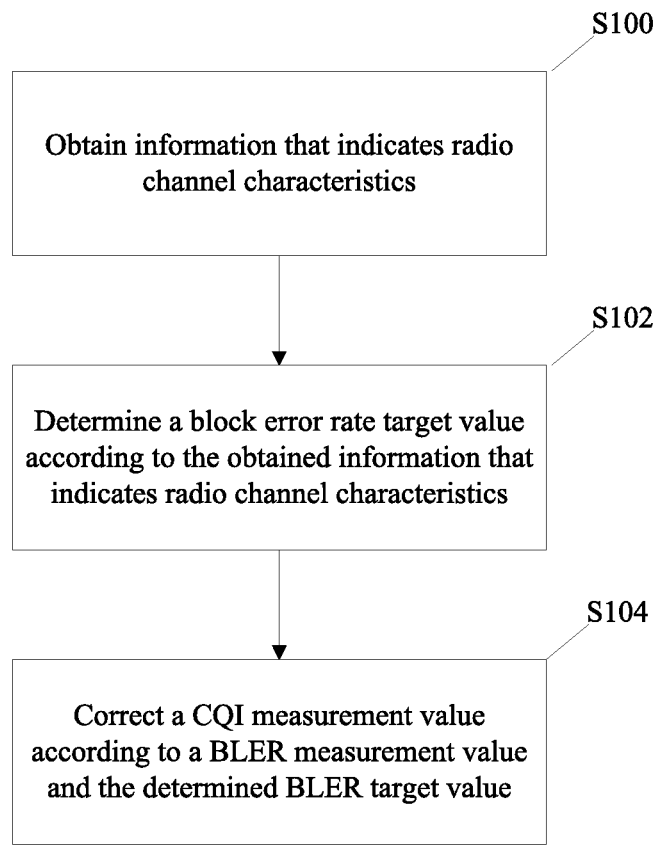
FIG. 1 is a flowchart of a method for correcting a CQI value according to an embodiment of the present invention.

An embodiment of the present invention provides a method for correcting a CQI value. As shown in FIG. 1, the method may include the following content.

S100. Obtain Information that Indicates Radio Channel Characteristics.

It should be noted that the radio channel characteristics may be indicated by using a variety of information, so long as the information can reflect the radio channel characteristics. For example, the radio channel characteristics may be indicated by using any one or more of the following information: a CQI mean value, a CQI difference value, a fluctuating value of a CQI measurement value relative to a CQI mean value, transmit power control (TPC) command statistical information and multipath information. When the radio channel characteristics are indicated by using more than one of the CQI mean value, the CQI difference value, the fluctuating value of a CQI measurement value relative to a CQI mean value, the TPC command statistical information and the multipath information, it means that the radio channel characteristics are reflected by using a combination of multiple pieces of information. The information that indicates radio channel characteristics may be obtained by a terminal device, and may also be obtained by a network side device.

The CQI difference value $\Delta CQI$ may be obtained in the following manner.

$\Delta CQI=abs(CQI(t)-CQI(t-n))$, where abs indicates that an absolute value is used, CQI(t) indicates a CQI measurement value at a current moment, and CQI(t−n) indicates a CQI value at a moment n unit times (for example, the unit time may be a transmission time interval TTI) before the current moment, where n is a natural number; or, if multiple CQI measurement values are obtained in a first preset time period, multiple CQI difference values can be obtained, and the multiple CQI difference values may be smoothed or averaged, and then an obtained result is used as a CQI difference value of the first preset time period. For example, it is assumed that the first preset time period includes 6 TTIs, beginning with n=3. If each TTI corresponds to one CQI value, from the first TTI to the seventh TTI, there are altogether six CQI values, including CQI(1), CQI(2), CQI(3), CQI(4), CQI(5) and CQI (6). Therefore, in the first preset time period, three difference values including $\Delta CQI_1=abs(CQI(4)-CQI(1))$, $\Delta CQI_2=abs(CQI(5)-CQI(2))$ and $\Delta CQI_3=abs(CQI(6)-CQI(1))$ can be obtained, and then $\Delta CQI_1$, $\Delta CQI_2$ and $\Delta CQI_3$ may be averaged, that is, $\Delta CQI=(\Delta CQI_1+\Delta CQI_2+\Delta CQI_3)/3$, so as to obtain a CQI difference value of the first preset time period. Alternatively, $\Delta CQI_1$, $\Delta CQI_2$ and $\Delta CQI_3$ may be smoothed by using a manner such as alpha filtering, for example, $\Delta CQI=\alpha \times \Delta CQI_3+(1-\alpha)\times \Delta CQI_2$, where $\alpha$ may be an arbitrary value between 0 and 1. It should be noted that, in the embodiment, the smoothing may also be implemented by using a manner except alpha filtering, which is not limited in the embodiment, provided that an effect of smoothing multiple CQI difference values in the first preset time period is achieved.

The fluctuating value of a CQI measurement value relative to a CQI mean value may be obtained in the following manner.

The fluctuating value of the CQI measurement value relative to the CQI mean value may be expressed in multiple manners, and can reflect a difference between an actually obtained CQI measurement value and a CQI mean value. For example, the fluctuating value may be expressed by using a standard deviation of a CQI value in a second preset time period. Alternatively, a fluctuating value of a CQI measurement value relative to a CQI mean value in the second preset time period may be expressed by $CQI_f=abs(CQI(t)-CQI_{mean})$, where $CQI_f$ indicates a fluctuating value of a CQI measurement value relative to a CQI mean value, abs indicates that an absolute value is used, CQI(t) indicates a CQI measurement value at t moment, and $CQI_{mean}$ indicates a CQI mean value. If there are multiple CQI measurement values in the second preset time period, fluctuating values of the multiple CQI measurement values relative to the CQI mean value can be obtained, and then the multiple fluctuating values may be further smoothed or averaged so as to obtain a $CQI_f$ of the second preset time period.

The CQI mean value may be obtained in the following manner.

The CQI mean value indicates a mean value of CQI values in a preset time period. The preset time period, for example, may be a third preset time period, and a CQI mean value in the third preset time period may be obtained in multiple manners. For example, multiple CQI values in the third preset time period are averaged to obtain the CQI mean value in the third preset time period. Alternatively, multiple CQI values in the third preset time period are smoothed and a result of the smoothing is used as the CQI mean value of the third preset time period. For example, the smoothing may be implemented by using alpha filtering: $CQI_{mean}=\alpha \times CQI(t)+(1-\alpha)\times CQI(t-m)$, where $\alpha$ may be an arbitrary value between 0 and 1, $CQI_{mean}$ indicates a CQI mean value, CQI(t) indicates a CQI value at a current moment, and CQI(t−m) indicates a CQI value at a moment m unit times (for example, the unit time is a TTI) before the current moment, where m is a natural number, and the unit time may be, for example, a transmission time interval TTI. It should be noted that, in the embodiment, the smoothing may be implemented by using a manner except alpha filtering, which is not limited in the embodiment, provided that an effect of smoothing multiple CQI values in the third preset time period is achieved.

The TPC command statistical information may be statistical information such as a mean value, a variance, a standard deviation, or the like obtained according to a TPC command. The TPC command statistical information may be obtained through the following approach.

According to at least one TPC command in a preset time period, a mean value, a variance, a standard deviation or the like of the TPC command in the preset time period is obtained.

The multipath information may include, but is not limited to, delay spread, Doppler spread, the number of paths, and the like. Obtaining the multipath information may be obtaining one or more of the number of paths, a multipath delay, a multipath intensity, and a Doppler frequency spread, which is not exemplified one by one herein. For a network side device, multipath information of an uplink signal may be obtained from the received uplink signal, and because it can be considered that uplink multipath information is similar to downlink multipath information, multipath information of a downlink signal can also be obtained; and for a user terminal device, multipath information may be obtained according to a multipath search result. It should be noted that the multipath information may also be information obtained after collecting statistics on multipath information in a time period.

Understandably, in step S100, if information such as a CQI mean value, a CQI difference value, and a fluctuating value of a CQI measurement value relative to a CQI mean value, and the like are obtained by a network side device, the information may be obtained by the network side device by collecting statistics on CQI values reported by a user terminal.

S102. Determine, according to the obtained information that indicates radio channel characteristics, a block error ratio BLER target value.

The BLER target value may be directly or indirectly determined by using the information that indicates radio channel characteristics obtained in step S100. For example, a mapping relationship between information that indicates radio channel characteristics and BLER target values may be prestored, and the BLER target value can be determined by searching for the mapping relationship. The mapping relationship may be, for example, in a tabular form. Understandably, the mapping relationship may be determined according to empirical values or obtained through emulation.

It should be noted that the method for determining a BLER target value in this step may be used to determine an initial BLER target value, or may be used to determine a total BLER target value. In other words, the method in the embodiment is applicable to different scenarios. Here, the initial BLER may be a block error rate of first transmission of a data block, and the total BLER may be a proportion of the number of negative acknowledgement messages (Negative Acknowledgement) in a total preset time period of data transmission. The meanings of the initial BLER and the total BLER are definite to persons skilled in the art, which is not described further here.

S104. Correct, according to a BLER measurement value and the determined BLER target value, a CQI measurement value.

In this step, a CQI value may be corrected according to the determined BLER target value and a BLER measurement value. For example, if the BLER measurement value is greater than the determined BLER target value, a CQI measurement value may be decreased. For example, a decrease step is subtracted from the CQI measurement value, that is $CQI_{correction}=CQI_{measurement}$–Decrease step, where $CQI_{correction}$ indicates a corrected CQI value, and $CQI_{measurement}$ indicates a CQI measurement value. The decreased CQI value is used as the corrected CQI value, and the value of the decrease step may be set according to an actual requirement. If the BLER measurement value is less than the determined BLER target value, a CQI measurement value may be increased. For example, an increase step is added to the CQI measurement value, that is $CQI_{correction}=CQI_{measurement}$+increase step. The increased CQI value is used as the corrected CQI value, and the value of the increase step may be set according to an actual requirement.

If the BLER target value determined in step S102 is an initial BLER target value, the BLER measurement value here may be a counted error probability of the first transmission of a data block. If the BLER target value determined in step S104 is a total BLER target value, the BLER measurement value here may be obtained by collecting statistics on NACK (Negative Acknowledgement) messages and ACK (Acknowledgement) messages in a fourth preset time period, for example, BLER=Number of NACKs/(Number of NACKs+Number of ACKs).

Specific values in the first preset time period, the second preset time period, the third preset time period and the fourth preset time period in the embodiment may be set according to an actual requirement, and are not limited in the embodiment.

Understandably, the method for correcting a CQI value in the embodiment may be implemented by a network side device (such as a base station device), or may be implemented by a user terminal device. If the correction of a CQI value is implemented by a user terminal device, the user terminal device reports the corrected CQI value to a network side device. Alternatively, the method for correcting a CQI value in the embodiment may be implemented jointly by a user terminal device and a network side device. For example, after step S100 may be completed by a user terminal device, where an obtained result is reported to a network side device by exchanging information, and then the network side device completes steps S102-S104. Understandably, any one of steps S100-S104 may be completed by a network side device or completed by a user terminal device.

According to the method for correcting a CQI value provided by the embodiment, a BLER target value is determined according to information that indicates radio channel characteristics, and then a CQI value is corrected according to the BLER target value, so that different channel conditions are considered and the CQI value returned is relatively accurate. Therefore, the impact of an error in a CQI measurement value can be avoided, and a transmission rate and air interface capacity can be improved As described in the embodiment above, a BLER target value may be indirectly determined by using obtained information that indicates radio channel characteristics. For example, the determining a BLER target value may be according to the information that indicates radio channel characteristics, determining a radio channel type by using a mapping relationship between information that indicates radio channel characteristics and radio channel types; and according to the radio channel type, determining the BLER target value by using a mapping relationship between radio channel types and BLER target values, or, if the obtained information that indicates radio channel characteristics includes first part information and second part information, according to the first part information, determining a radio channel type by using a mapping relationship between first part information and radio channel types; and according to the second part information and the radio channel type, determining the BLER target value by using a mapping relationship between second part information, radio channel types and BLER target values.

In the embodiment, at least one radio channel type may be divided in advance according to information that indicates radio channel characteristics, so that a mapping relationship exists between information that indicates radio channel characteristics and radio channel types. Therefore, mapping the obtained information that indicates radio channel characteristics to a radio channel type is that the radio channel type can be obtained by searching for the mapping relationship according to the obtained information that indicates radio channel characteristics. The radio channel types may include, for example, type A, type B and the like, and specific types are not limited in this embodiment.

A certain mapping relationship may also exist between radio channel types and BLER target values. Then, according to an obtained radio channel type, a BLER target value can be determined by searching for the mapping relationship. Understandably, the mapping relationship between radio channel types and BLER target values may be preset according to empirical values or emulation results. The mapping relationship between radio channel types and BLER target values may be, for example, shown in Table 1.

TABLE 1

| Type A | Type B | Type C | Type D | Type E |
|---|---|---|---|---|
| BLER target value 1 | BLER target value 2 | BLER target value 3 | BLER target value 4 | BLER target value 5 |

Figure 2:
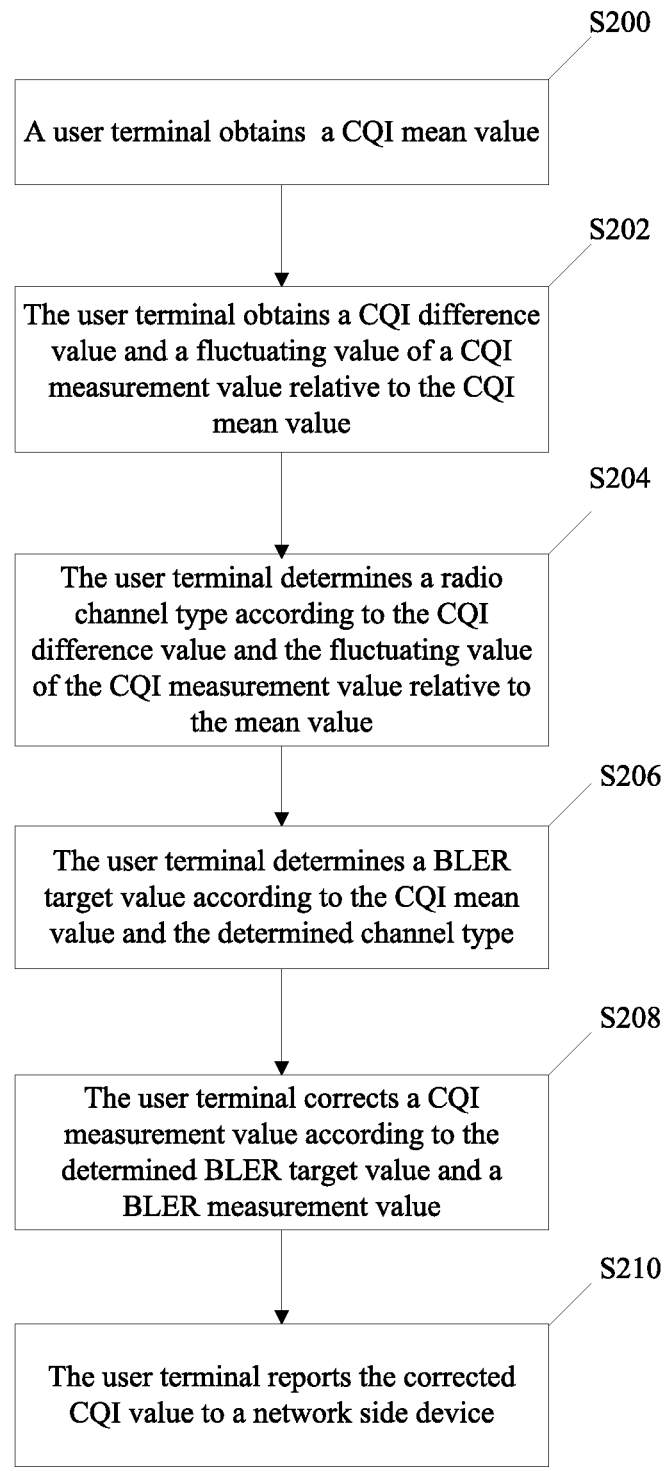
FIG. 2 is a flowchart of a method for correcting a CQI value according to another embodiment of the present invention.

Further, by assuming that the steps of correcting a CQI value are completed by a user terminal, if the first part information is a CQI difference value and a fluctuating value of a CQI measurement value relative to a CQI mean value, and the second part information is a CQI mean value, another embodiment of the present invention also provides a method for correcting a CQI value. As shown in FIG. 2, the method may include the following content.

S200. A User Terminal Obtains a CQI Mean Value.

Here, for a manner for obtaining a CQI mean value, refer to related descriptions of step S100. Details are not repeated here.

S202. The user terminal obtains a CQI difference value and a fluctuating value of a CQI measurement value relative to the CQI mean value.

The user terminal may obtain an actual CQI value by means of measurement, and then may obtain a CQI difference value and a fluctuating value of a CQI measurement value relative to the CQI mean value according to the obtained actual CQI value.

For a manner for obtaining a CQI difference value, refer to descriptions in the previous embodiment. Here, ΔCQI indicates an obtained CQI difference value.

For a manner for obtaining a fluctuating value of a CQI measurement value relative to a CQI mean value, refer to descriptions in the previous embodiment. Here, it is assumed that $abs(CQI(t)-CQI_{mean})$ indicates a fluctuating value of a CQI measurement value relative to a mean value. If there are six actual CQI values, respectively CQI(1), CQI(2), CQI(3), CQI(4), CQI(5) and CQI(6), in a second preset time period, six fluctuating values can be obtained, including $CQI_{f1}=abs(CQI(1)-CQI_{mean})$, $CQI_{f2}=abs(CQI(2)-CQI_{mean})$, $CQI_{f3}=abs(CQI(3)-CQI_{mean})$, $CQI_{f4}=abs(CQI(4)-CQI_{mean})$, $CQI_{f5}=abs(CQI(5)-CQI_{mean})$ and $CQI_{f6}=abs(CQI(6)-CQI_{mean})$. Then the six fluctuating values obtained in the second preset time period are averaged, that is, $CQI_f=(CQI_{f1}+CQI_{f2}+CQI_{f3}+CQI_{f4}+CQI_{f5}+CQI_{f6})/6$, and the mean value is used as the fluctuating value of CQI values relative to the mean value of the second preset time period.

S204. The user terminal determines, according to the CQI difference value and the fluctuating value of the CQI measurement value relative to the mean value, a radio channel type.

Here, the radio channel type may be at least one channel type configured in advance according to empirical values or other requirements and corresponding to the information (such as a CQI difference value and a fluctuating value of a CQI measurement value relative to a mean value) that indicates radio channel characteristics, and it is assumed that there are a plurality of types including type A, type B, type C and the like. In the embodiment, it is assumed that the radio channel type determined according to the CQI difference value and the fluctuating value of the CQI measurement value relative to the mean value is type A.

S206. The user terminal determines, according to the CQI mean value and the determined channel type, a BLER target value.

In this embodiment, a mapping relationship between CQI mean values, radio channel types and BLER target values may be prestored, and for example, the mapping relationship may be a two-dimensional table shown in Table 2.

TABLE 2

| CQI mean value | Radio channel types | | | | |
|---|---|---|---|---|---|
| | Type A | Type B | Type C | Type D | Type E |
| Range 1 | BLER target value 11 | BLER target value 12 | BLER target value 13 | BLER target value 14 | BLER target value 15 |
| Range 2 | BLER target value 21 | BLER target value 22 | BLER target value 23 | BLER target value 24 | BLER target value 25 |
| Range 3 | BLER target value 31 | BLER target value 32 | BLER target value 33 | BLER target value 34 | BLER target value 35 |
| Range 4 | BLER target value 41 | BLER target value 42 | BLER target value 43 | BLER target value 44 | BLER target value 45 |
| Range 5 | BLER target value 51 | BLER target value 52 | BLER target value 53 | BLER target value 54 | BLER target value 55 |

In Table 2, a corresponding BLER target value can be determined according to a range to which each CQI mean value belongs and a radio channel type. In the above Table 2, for example, BLER target value 11 and BLER target value 12 indicate different BLER target values, and a number after a BLER target value is a mark number rather than a specific value. Understandably, according to the CQI mean value obtained in step S200, which range the mean value belongs to can be determined, and therefore, a BLER target value can be determined by using Table 2.

S208. The user terminal corrects, according to the determined BLER target value and a BLER measurement value, the CQI measurement value.

Here, for a manner for correcting a CQI measurement value, refer to related descriptions of step S104. Details are not repeated here.

Further, after correcting the CQI value, the user terminal may continue to execute step S210.

S210. The User Terminal Reports the Corrected CQI Value to a Network Side Device.

After correcting the CQI value, the user terminal may report the corrected CQI value to the network side device, so that the network side device learns relatively accurate CQI information and uses the information as a reference for subsequent data transmission control.

Understandably, this embodiment is described exemplarily by assuming that radio channel characteristics are indicated by a combination of a CQI difference value and a fluctuating value of a CQI measurement value relative to a mean value. There are other ways of indicating radio channel characteristics. For example, radio channel characteristics are indicated by a combination of TPC command statistical information and multipath information (such as delay spread statistical information). For details, refer to related descriptions of step S100.

In this embodiment, a user terminal determines, according to a CQI mean value and information that indicates radio channel characteristics, a BLER target value so as to correct a CQI value, and then reports the corrected CQI value to a network side device, so that different channel conditions are considered, and the CQI value returned is relatively accurate. Therefore, the impact of an error in a CQI measurement value can be avoided, and a transmission rate and air interface capacity can be improved.

Figure 3:
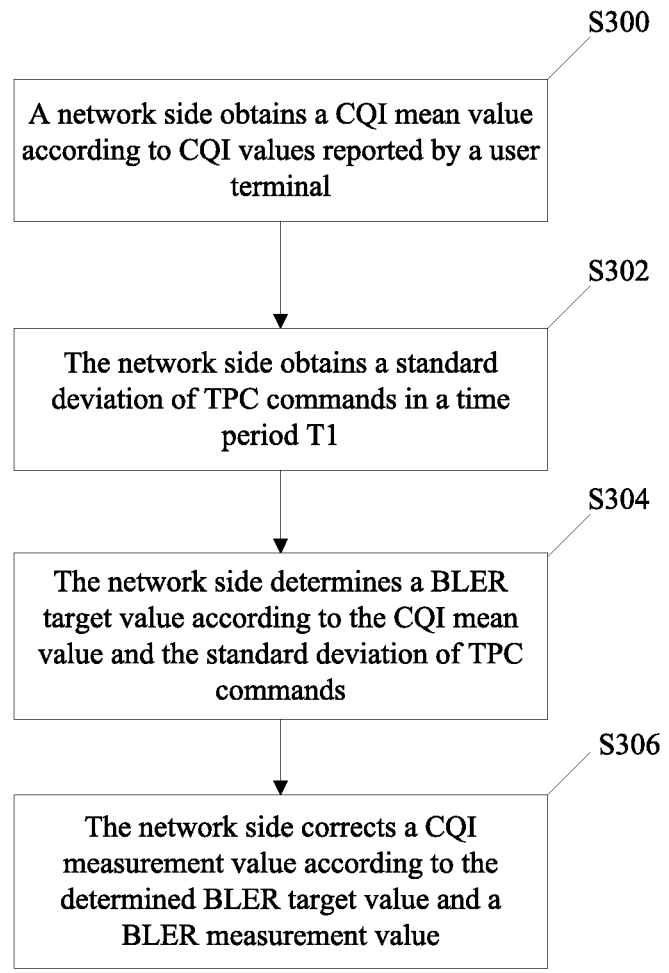
FIG. 3 is a flowchart of a method for correcting a CQI value according to still another more embodiment of the present invention.

Assuming that the correction of a CQI value is completed by a network side device (such as a base station), another embodiment of the present invention also provides a method for correcting a CQI value. In this embodiment, it is assumed that first part information is TPC command statistical information, and second part information is a CQI mean value. As shown in FIG. 3, the method may include the following content:

S300. A network side device obtains, according to CQI values reported by a user terminal, a CQI mean value.

Here, after receiving CQI values reported by the user terminal, the network side device may further obtain a CQI mean value. For a specific manner for obtaining a CQI mean value, refer to related descriptions of step S100.

S302. The network side obtains a standard deviation of TPC commands in a time period T1.

A TPC command is a command for transmit power control, which controls the transmit power to be increased or decreased by one step or to remain unchanged, or the like. For example, when a TPC command is 1, it means that the transmit power is increased by one step, when the TPC command is −1, it means that the transmit power is decreased by one step, and when the TPC command is 0, it means that the transmit power remains unchanged. By collecting statistics on TPC commands in a preset time period (for example, T1), the network side device can obtain a standard deviation of TPC commands in the time period T1, and then, the standard deviation can be used for subsequent processing.

Understandably, the execution sequence of steps S300 and S302 is not limited in this embodiment, and alternatively, steps S300 and S302 may be executed simultaneously.

S304. The network side determines, according to the CQI mean value and the standard deviation of TPC commands, a BLER target value.

Here, the BLER target value may be determined by searching for a pre-configured mapping relationship. The mapping relationship may be a mapping relationship between CQI mean values, standard deviations of TPC commands, and BLER target values, so that a BLER target value can be determined according to the CQI mean value and the standard deviation of TPC commands.

S306. The network side corrects, according to the determined BLER target value and a BLER measurement value, a CQI measurement value.

Here, for a manner for correcting a CQI measurement value, refer to related descriptions of step S104 Details are not be repeated here.

In this embodiment, a network side determines, according to a CQI mean value and TPC command statistical information, a BLER target value, and then corrects a CQI value according to the BLER target value, so that different channel conditions are considered, and the CQI value returned is relatively accurate. Therefore, the impact of an error in a CQI measurement value can be avoided, and a transmission rate and air interface capacity can be improved.

Figure 4:
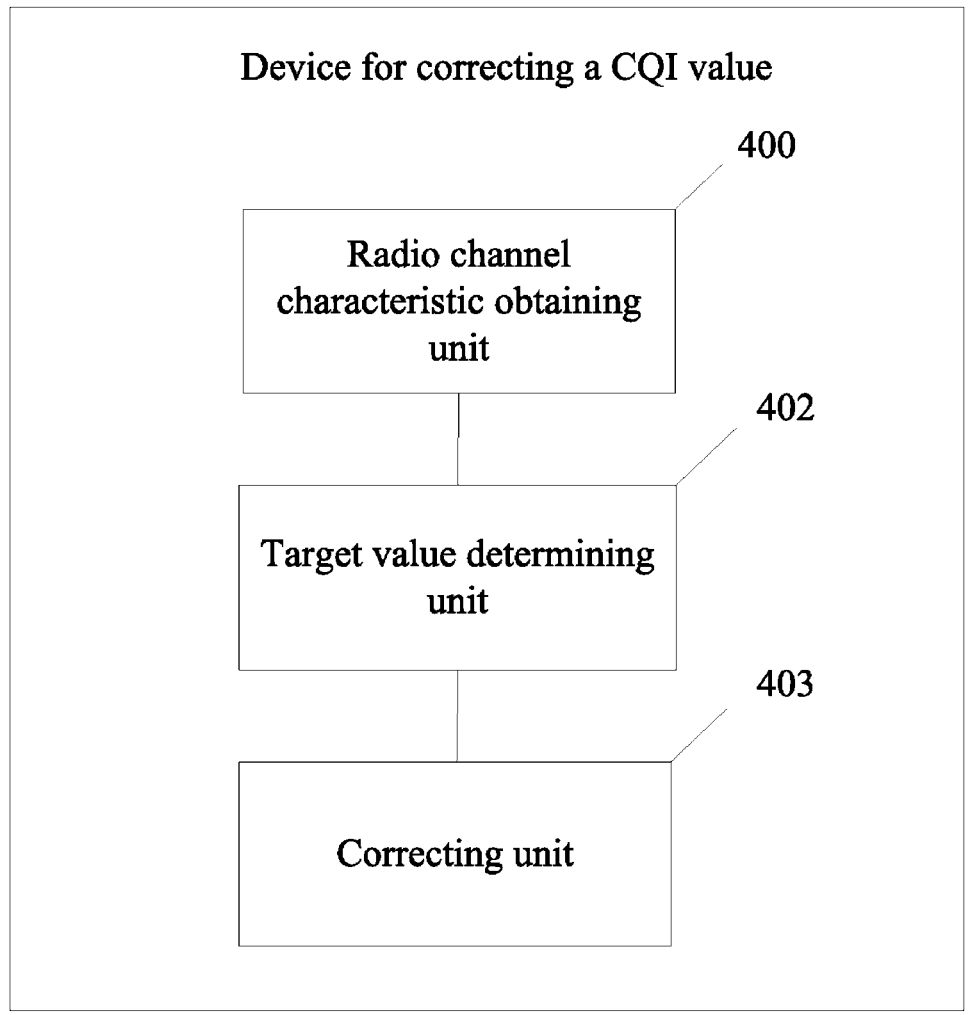
FIG. 4 is a schematic structural diagram of a device for correcting a CQI according to an embodiment of the present invention.

An embodiment of the present invention also provides a device for correcting a CQI value. As shown in FIG. 4, the device for correcting a CQI value may include a radio channel characteristic obtaining unit 401, a target value determining unit 402, and a correcting unit 403.

The radio channel characteristic obtaining unit 401 is configured to obtain information that indicates radio channel characteristics.

It should be noted that radio channel characteristics may be indicated by using a variety of information. For example, radio channel characteristics may be indicated by using any one or more of the following information: a CQI mean value, a CQI difference value, a fluctuating value of a CQI measurement value relative to a CQI mean value, TPC command statistical information and multipath information. When the radio channel characteristics are indicated by using more than one of the CQI mean value, the CQI difference value, the fluctuating value of a CQI measurement value relative to a CQI mean value, the TPC command statistical information and the multipath information, it means that the radio channel characteristics are reflected by using a combination of multiple pieces of information. For a specific manner for obtaining information that indicates radio channel characteristics, refer to related descriptions of step S100.

The target value determining unit 402 is configured to determine, according to the information that indicates radio channel characteristics obtained by the radio channel characteristic obtaining unit 401, a BLER target value.

The correcting unit 403 is configured to correct, according to the BLER target value determined by the target value determining unit 402 and a BLER measurement value, a CQI measurement value.

A manner in which the correcting unit 403 corrects a CQI measurement value may be described as follows. If the BLER measurement value is greater than the determined BLER target value, the CQI measurement value is decreased and the decreased CQI value is used as a corrected CQI value. If the BLER measurement value is less than the determined BLER target value, the CQI measurement value is increased and the increased CQI value is used as a corrected CQI value. Here, the BLER measurement value may be a mean value of actual BLER values obtained by means of measurement. Then, the correcting unit 403 may include a decreasing subunit, configured to, if the BLER measurement value is greater than the determined BLER target value, decrease a CQI measurement value, and use the decreased CQI value as a corrected CQI value, or, an increasing subunit, configured to, if the BLER measurement value is less than the determined BLER target value, increase a CQI measurement value, and use the increased CQI value as a corrected CQI value.

Specifically, the device for correcting a CQI value may be a user terminal device, or may be a network side device such as a base station or an evolved base station or the like. Understandably, some modules of the device for correcting a CQI value may be included in a user terminal device, and the other modules are included in a network side device, where the correction of a CQI value is completed by using interaction between the user terminal device and the network side device. No limitation is imposed thereon in this embodiment.

Further, the target value determining unit 402 may determine the BLER target value in multiple manners, and the target value determining unit may include a first determining subunit, configured to, according to the information that indicates radio channel characteristics, determine the BLER target value by searching for a mapping relationship between information that indicates radio channel characteristics and BLER target values; or the target value determining unit 402 may include a second determining subunit, configured to, according to the information that indicates radio channel characteristics, determine a radio channel type by using a mapping relationship between information that indicates radio channel characteristics and radio channel types, and then according to the radio channel type, determine the BLER target value by using a mapping relationship between radio channel types and BLER target values; or, if the obtained information that indicates radio channel characteristics includes first part information and second part information, the target value determining unit may include a third determining subunit, configured to, according to the first part information, determine a radio channel type by using a mapping relationship between first part information and radio channel types, and then according to the second part information and the radio channel type, determine the BLER target value by using a mapping relationship between second part information, radio channel types, and BLER target values.

Understandably, the foregoing embodiments of the device for correcting a CQI value belong to a same idea as the embodiments of the method for correcting a CQI value. For a specific implementation process of each unit or subunit, refer to the method embodiments, which is not repeated here.

The described apparatus or system embodiments are merely exemplary, where units explained as separate parts may be or may not be physically separated, parts displayed as units may be or may not be physical units, which means that the parts may be located at one place, or may be distributed to multiple network units. Part or all of the units may be selected for achieving the purpose of the solutions of the embodiments according to actual needs. Persons of ordinary skill in the art can understand and implement the embodiments above without creative efforts.

It should be noted that, in this application, relational terms such as first and second and the like are merely used to distinguish one noun or operation from another entity or operation, and do not necessarily require or suggest that any such actual relation or sequence should exist among the nouns or operations. And terms 'include', 'contain' or any other variants thereof are meant to cover non-exclusive inclusions, so that processes, methods, objects or devices including a series of elements not only include the elements, but also include other elements which are not listed clearly, or also include inherent elements of the processes, methods, objects or devices. In the absence of more restrictions, an element restricted by a sentence "include one . . . " shall not exclude that other same elements also exist in a process, method, object or device that includes the element.

A person of ordinary skill in the art may understand that all or a part of the steps of the methods in the foregoing embodiments may be implemented by a program instructing relevant hardware. The program may be stored in a computer readable storage medium. The storage medium may be a read-only memory, a magnetic disk, or an optical disc.

The purpose, technical solutions and beneficial effects of the present invention have been described through specific embodiments, and it should be understood that the embodiments above are merely the specific implementation modes of the present invention, and are not intended to limit the protection scope of the present invention. Any setting, equivalent replacement and improvement and the like based on the spirit and the principle of the present invention shall fall within the protection scope of the present invention.

What is claimed is:

1. A method for correcting a channel quality indicator value, the method comprising:
   obtaining information that indicates radio channel characteristics;
   determining, according to the obtained information that indicates radio channel characteristics, a block error rate (BLER) target value; and
   if a BLER measurement value is greater than the BLER target value, decreasing a channel quality indicator (CQI) measurement value, and using the decreased CQI measurement value as a corrected CQI value; or if a BLER measurement value is less than the BLER target value, increasing a channel quality indicator (CQI) measurement value, and using the increased CQI measurement value as a corrected CQI value.

2. The method according to claim 1, wherein determining the BLER target value comprises:
   according to the information that indicates radio channel characteristics, determining the BLER target value by using a mapping relationship between information that indicates radio channel characteristics and BLER target values; or
   according to the information that indicates radio channel characteristics, determining a radio channel type by using a mapping relationship between information that indicates radio channel characteristics and radio channel types; and according to the radio channel type, determining the BLER target value by using a mapping relationship between radio channel types and BLER target values; or
   if the information that indicates radio channel characteristics comprises first part information and second part information, according to the first part information, determining a radio channel type by using a mapping relationship between first part information and radio channel types; and according to the second part information and the radio channel type, determining the BLER target value by using a mapping relationship between second part information, radio channel types, and BLER target values.

3. The method according to claim 2, wherein:
   the first part information comprises a CQI difference and/or a fluctuating value of a CQI measurement value relative to a CQI mean value, and the second part information is a CQI mean value; or
   the first part information comprises TPC command statistical information and/or multipath information, and the second part information is a CQI mean value.

4. The method according to claim 1, wherein the obtaining information that indicates radio channel characteristics comprises:
   obtaining one or more of a CQI mean value, a CQI difference value, a fluctuating value of a CQI measurement value relative to a CQI mean value, transmit power control (TPC) command statistical information and multipath information.

5. The method according to claim 4, wherein obtaining the CQI difference value comprises:
   obtaining the CQI difference value according to $\Delta CQI = abs(CQI(t) - CQI(t-n))$, wherein abs indicates that an absolute value function, $CQI(t)$ indicates a CQI measurement value at a current moment, and $CQI(t-n)$ indicates a CQI value at a moment n unit times before the current moment, wherein n is a natural number.

6. The method according to claim 5, wherein, if multiple CQI difference values are obtained in a first preset time period, the multiple CQI difference values are smoothed or averaged, and a result obtained after the smoothing or averaging is used as a CQI difference value of the first preset time period.

7. The method according to claim 4, wherein the obtaining a fluctuating value of a CQI measurement value relative to a CQI mean value comprises:
   obtaining a standard deviation of CQI values in a second preset time period; or
   obtaining the fluctuating value according to $CQI_f = abs(CQI(t) - CQI_{mean})$, wherein $CQI_f$ indicates a fluctuating value of a CQI measurement value relative to a CQI mean value, abs indicates that an absolute value is used, $CQI(t)$ indicates a CQI measurement value at t moment, and $CQI_{mean}$ indicates a CQI mean value.

8. The method according to claim 7, wherein, if fluctuating values of multiple CQI measurement values relative to a CQI mean value are obtained in the second preset time period, the fluctuating values are smoothed or averaged, and a result obtained after the smoothing or averaging is used as a fluctuating value of the second preset time period.

9. The method according to claim 4, wherein obtaining the TPC command statistical information comprises:
   according to at least one TPC command in a preset time period, obtaining a mean value, a variance or a standard deviation of the TPC command in the preset time period, and using the mean value, the variance or standard deviation of the TPC command as the TPC command statistical information.

10. The method according to claim 4, wherein obtaining the multipath information comprises obtaining one or more of the number of paths, a multipath delay, a multipath intensity, and Doppler frequency spread.

11. The method according to claim 1, wherein the BLER target value is an initial BLER target value or a total BLER target value.

12. A device for correcting a channel quality indicator value, the device comprising:
   a radio channel characteristic obtaining unit, configured to obtain information that indicates radio channel characteristics;
   a target value determining unit, configured to determine, according to the information that indicates radio channel characteristics obtained by the radio channel characteristic obtaining unit, a block error rate (BLER target value; and
   a correcting unit, configured to decrease a channel quality indicator (CQI) measurement value, and use the decreased CQI measurement value as a corrected CQI value if a BLER measurement value is greater than the determined BLER target value, or configured to increase a CQI measurement value, and use the increased CQI measurement value as a corrected CQI value if a BLER measurement value is less than the determined BLER target value.

13. The device according to claim 12, wherein
the target value determining unit comprises a first determining subunit, configured to, according to the obtained information that indicates radio channel characteristics, determine the BLER target value by searching for a mapping relationship between information that indicates radio channel characteristics and BLER target values; or the target value determining unit comprises a second determining subunit, configured to, according to the information that indicates radio channel characteristics, determine a radio channel type by using a mapping relationship between information that indicates radio channel characteristics and radio channel types; and according to the radio channel type, determine the BLER target value by using a mapping relationship between radio channel types and BLER target values; or if the obtained information that indicates radio channel characteristics comprises first part information and second part information, the target value determining unit comprises a third determining subunit, configured to, according to the first part information, determine a radio channel type by using a mapping relationship between first part information and radio channel types; and according to the second part information and the radio channel type, determine the BLER target value by using a mapping relationship between second part information, radio channel types, and BLER target values.

14. The device according to claim 13, wherein the first part information comprises a CQI difference value and/or a fluctuating values of a CQI measurement value relative to a CQI mean value, and the second part information is a CQI mean value; or
the first part information comprises TPC command statistical information and/or multipath information, and the second part information is a CQI mean value.

15. The device according to claim 12, wherein the information that indicates radio channel characteristics obtained by the radio channel characteristic obtaining unit comprises one or more of a CQI mean value, a CQI difference value, a fluctuating value of a CQI measurement value relative to a CQI mean value, transmit power control TPC command statistical information and multipath information.

16. The device according to claim 15, wherein
the radio channel characteristic obtaining unit is specifically configured to obtain the CQI difference value according to $\Delta CQI=abs(CQI(t)-CQI(t-n))$, wherein abs indicates that an absolute value is used, $CQI(t)$ indicates a CQI measurement value at a current moment, and $CQI(t-n)$ indicates a CQI value at a moment n unit times before the current moment, wherein n is a natural number; or the radio channel characteristic obtaining unit is specifically configured to obtain a standard deviation of CQI values in a second preset time period, and use the standard deviation of CQI values in the second preset time period as the fluctuating value; or, according to $CQI_f=abs(CQI(t)-CQI_{mean})$, obtain the fluctuating value, wherein $CQI_f$ indicates a fluctuating value of a CQI measurement value relative to a CQI mean value, abs indicates that an absolute value is used, $CQI(t)$ indicates a CQI measurement value at t moment, and $CQI_{mean}$ indicates a CQI mean value; or the radio channel characteristic obtaining unit is specifically configured to, according to at least one TPC command in a preset time period, obtain a mean value, a variance or a standard deviation of the TPC command in the preset time period, and use the mean value, variance or standard deviation of the TPC command as the TPC command statistical information; or the radio channel characteristic obtaining unit is specifically configured to obtain one or more of the number of paths, a multipath delay, a multipath intensity, and Doppler frequency spread.

17. The device according to claim 15, wherein:
if multiple CQI difference values are obtained in a first preset time period, the radio channel characteristic obtaining unit is further configured to smooth or average the multiple CQI difference values, and use a result obtained after the smoothing or averaging as a CQI difference value of the first preset time period; and
if multiple fluctuating values of CQI measurement values relative to a CQI mean value are obtained in a second preset time period, the radio channel characteristic obtaining unit is further configured to smooth or average the multiple fluctuating values, and use a result obtained after the smoothing or averaging as a fluctuating value of the second preset time period.

18. The device according to claim 12, wherein the BLER target value is an initial BLER target value or a total BLER target value.

19. A device for correcting a channel quality indicator value, comprising:
a processor; and
a non-transitory computer-readable storage medium coupled to the processor and storing programming for execution by the processor, wherein the programming, when executed by the processor, configures the device to:
obtain information that indicates radio channel characteristics;
determine, according to the information that indicates radio channel characteristics, a block error rate (BLER) target value; and
decrease a channel quality indicator (CQI) measurement value, and use the decreased CQI measurement value as a corrected CQI value if a BLER measurement value is greater than the determined BLER target value; or increase a CQI measurement value, and use the increased CQI measurement value as a corrected CQI value if a BLER measurement value is less than the determined BLER target value.

20. The device according to claim 19, wherein the programming, when executed by the processor, configures the device to:
according to the obtained information that indicates radio channel characteristics, determine the BLER target value by searching for a mapping relationship between information that indicates radio channel characteristics and BLER target values; or
according to the information that indicates radio channel characteristics, determine a radio channel type by using a mapping relationship between information that indicates radio channel characteristics and radio channel types; and according to the radio channel type, determine the BLER target value by using a mapping relationship between radio channel types and BLER target values; or
if the obtained information that indicates radio channel characteristics comprises first part information and second part information, according to the first part information, determine a radio channel type by using a mapping relationship between first part information and radio channel types; and according to the second part information and the radio channel type, determine the BLER target value by using a mapping relationship between second part information, radio channel types, and BLER target values.

* * * * *